United States Patent
Ha et al.

(10) Patent No.: US 8,310,622 B2
(45) Date of Patent: Nov. 13, 2012

(54) OPTICAL PLATE, METHOD OF MANUFACTURING THE SAME AND LIQUID CRYSTAL HAVING THE SAME

(75) Inventors: Ju-Hwa Ha, Seoul (KR); Jung-Wook Paek, Suwon-si (KR); Myung-Woon Lee, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 588 days.

(21) Appl. No.: 12/266,270

(22) Filed: Nov. 6, 2008

(65) Prior Publication Data

US 2009/0167985 A1 Jul. 2, 2009

(30) Foreign Application Priority Data

Dec. 31, 2007 (KR) .................. 10-2007-0141691

(51) Int. Cl.
*G02F 1/1335* (2006.01)
*G02F 1/13357* (2006.01)
*G02B 5/02* (2006.01)

(52) U.S. Cl. ........... 349/64; 349/95; 362/97.2; 362/330; 359/599

(58) Field of Classification Search ............. 349/60–62, 349/64, 95; 362/97.2, 330; 359/599; 264/1.1
See application file for complete search history.

(56) References Cited

U.S. PATENT DOCUMENTS

| | | | |
|---|---|---|---|
| 5,196,960 A * | 3/1993 | Matsuzaki et al. | 359/453 |
| 7,105,222 B2 | 9/2006 | Marzolin et al. | |
| 2003/0165675 A1 | 9/2003 | Marzolin et al. | |
| 2006/0204901 A1 | 9/2006 | Shimizu | |
| 2006/0227323 A1 * | 10/2006 | Goto | 356/336 |
| 2007/0015090 A9 | 1/2007 | Shimizu | |
| 2007/0165303 A1 * | 7/2007 | Osawa et al. | 359/460 |

FOREIGN PATENT DOCUMENTS

| | | |
|---|---|---|
| CN | 1430731 | 7/2003 |
| CN | 1831564 | 9/2006 |
| EP | 1 285 287 | 6/2006 |
| JP | 2007003571 | 1/2007 |
| KR | 1020060100230 | 9/2006 |
| KR | 1020070003123 | 1/2007 |
| TW | 200726997 A | 7/2007 |

(Continued)

OTHER PUBLICATIONS

English Abstract for Publication No. 1020060100230.

(Continued)

*Primary Examiner* — Uyen Chau N Le
*Assistant Examiner* — Michael Mooney
(74) *Attorney, Agent, or Firm* — F. Chau & Associates, LLC

(57) ABSTRACT

An optical plate having improved light scattering power, a method of manufacturing the same and a liquid crystal display having the same. An optical plate includes a base material layer, and a lens portion having a plurality of unit lenses formed on one surface of the base material layer, each of the unit lenses having a convex shape, wherein a diffusion portion is formed in each of the unit lenses. The amount and cost of the light diffusing agent can be reduced, light transmittance can be improved, light uniformity can be enhanced without occurrence of bright lines, and intensity of light to be viewed is improved, thereby enhancing luminance.

18 Claims, 14 Drawing Sheets

FOREIGN PATENT DOCUMENTS

| WO | WO 01/90787 | | 11/2001 |
|----|----|----|----|
| WO | WO 2006057245 | * | 6/2006 |

OTHER PUBLICATIONS

English Abstract for Publication No. 1020070003123.
English Abstract for Publication No. JP2007003571.
English Abstract for Publication No. WO 01/90787.
English Abstract for Publication No. CN 1430731.
English Abstract for Publication No. CN 1831564.
Chinese Office Action Dated Dec. 22, 2011.
English Translation of TW 200726997A.

* cited by examiner

Conventional example       Embodiment l' > l
d' > d

OPTICAL PLATE, METHOD OF MANUFACTURING THE SAME AND LIQUID CRYSTAL HAVING THE SAME

This application claims priority from Korean Patent application No. 10-2007-0141691, filed on Dec. 31, 2007, and all the benefits accruing therefrom under 35 U.S.C. 119, the contents of which are herein incorporated by reference in their entirety.

BACKGROUND OF THE INVENTION

1. Field of the Invention

The present disclosure is directed to an optical plate, a method of manufacturing the same and a liquid crystal display having the same, and more particularly, to an optical plate having improved light scattering power, a method of manufacturing the same and a liquid crystal display having the same.

2. Description of the Related Art

Since a liquid crystal display (LCD), which is widely used as a flat panel display, is a passive light-emitting device that is not self-luminescent, a backlight assembly is attached as a light source to a rear surface of an LCD panel, thereby implementing images. Thus, a quality of the LCD is influenced depending on a structure of the backlight assembly.

A backlight assembly is classified as an edge type or a direct type depending on the position of a light source with respect to a display surface. In the edge type backlight assembly, a lamp is positioned at a side of the display surface, so that a light guide plate for converting linear light into surface light is required. On the other hand, in the direct type backlight assembly, a lamp is positioned directly below the display surface, so that no light guide plate is required. Among these backlight assemblies, the direct type backlight assembly has high light efficiency, a simple structure, and a display surface of an unrestricted size, so that it is widely used for large-sized LCDs.

The direct type backlight assembly includes a plurality of lamps mounted under the display surface, a reflective plate for reflecting light emitted from the lamps to the display surface to prevent loss of light, and a diffusion plate and a diffusion sheet for diffusing light over the lamps to uniformly emit light.

However, since the direct type backlight assembly has lamps arranged on a plane, the shapes of the lamps, i.e., bright lines, appear on an LCD panel, and thus, a gap between the lamps and the LCD panel should be maintained to some degree. However, there is a thickness limitation, and a luminance nonuniformity is caused throughout the LCD panel. That is, since a plurality of lamps are positioned below the display surface in the direct type backlight assembly, the rear surface of the diffusion plate positioned perpendicular to the lamps has a different light intensity from the rear surface of the diffusion plate positioned between the lamps, which results in a luminance nonuniformity.

SUMMARY OF THE INVENTION

Embodiments of the present invention provide an optical plate, wherein light scattering power is improved to prevent bright lines from occurring and to enhance luminance and uniformity, and a gap between lamps and an LCD panel is shortened to reduce thickness, a method of manufacturing the optical plate, and an LCD having the same.

According to an aspect of the present invention, there is provided an optical plate, which includes a base material layer, and a lens portion having a plurality of unit lenses formed on one surface of the base material layer, each of the unit lenses having a convex shape, wherein a diffusion portion is formed in each of the unit lenses.

The diffusion portion may be about 20% or less of a height of the unit lens, the maximum thickness of the diffusion portion may be about 20% or less of the height of the unit lens, or the diffusion portion may be formed in a region over a imaginary line connecting intersection points at which a surface of the unit lens intersects with lines biased at about ±15 degrees from a center line with respect to the center of the unit lens.

The diffusion portion may be formed in a crescent shape under or on a surface of the unit lens. Also, an interface of the diffusion portion and the unit lens may have a shape of one end portion of an ellipse.

The unit lens may have a shape of one end portion of an ellipse, and a major radius of the ellipse may be about 1.4 to about 1.85 times of a minor radius of the ellipse. Also, the diffusion portion or the base material layer may contain at least one light diffusing agent selected from the group comprising silicone-based crosslinked particles, acryl-based crosslinked particles, styrene-based crosslinked particles, methyl methacrylate-styrene copolymer-based crosslinked particles, calcium carbonate, barium sulfate, aluminum hydroxide, titanium oxide, talcum and glass beads.

A weight of the light diffusing agent may be about 4% or less of that of the diffusion portion. Alternatively, a volume of the light diffusing agent may be about 2% or less of that of the diffusion portion.

The unit lens may have a height of about 50 to about 140 μm. The unit lens may have a pitch of about 150 to about 250 μm. The optical plate may have a thickness of about 0.8 to about 1.6 mm.

In a cross section of the diffusion portion, an angle between extension lines extending from a first point that is the highest point of the unit lens respectively to second and third points of an outer diameter of the unit lens may be about 90 to about 108 degrees, the diffusion portion may be formed above an extension line connecting the second and third points, and the extension lines connecting the first, second and third points may define an isosceles triangle.

A fourth point may positioned below the first point in the isosceles triangle, an extension line extending from the fourth point to the second and third points may be curved, and the diffusion portion may be formed above an extension line connecting the first, fourth and third points.

The optical plate may further include at least one film layer formed on one surface of the base material layer. The film layer may be provided on the other surface of the base material layer, and random embossed portions may be formed on the film layer. An average roughness of the random embossed portions may be about 2 to about 3.5.

A distance from a point of an outer diameter of the unit lens to the highest point of the unit lens may be greater than a distance from the point of the outer diameter to the lowest point of the diffusion portion.

According to another aspect of the present invention, there is provided a method of manufacturing an optical plate, which includes providing an optical plate including a lens portion having a plurality of unit lenses formed on one surface of a base material layer, each of the unit lenses having a convex shape; and forming a diffusion portion on the optical plate.

The optical plate may be formed by any one of a casting method, an injecting molding method, an extruding method and a co-extruding method. The method diffusion portion may be formed by applying light diffusing agent to the optical plate by a silk-screening method. The method may further include forming at least one film layer on the base material layer. The light diffusing agent may be intermittently applied by a silk-screening method.

According to a further aspect of the present invention, there is provided a liquid crystal display, which includes a backlight assembly including an optical plate disposed over a light source, the optical plate having a base material layer and a lens portion with a plurality of unit lenses formed on one surface of the base material layer, each of the unit lenses having a convex shape, wherein a diffusion portion is formed in each of the unit lenses; and an LCD panel disposed at a light exiting side of the backlight assembly to display images.

DETAILED DESCRIPTION OF THE INVENTION

Figure 1A:
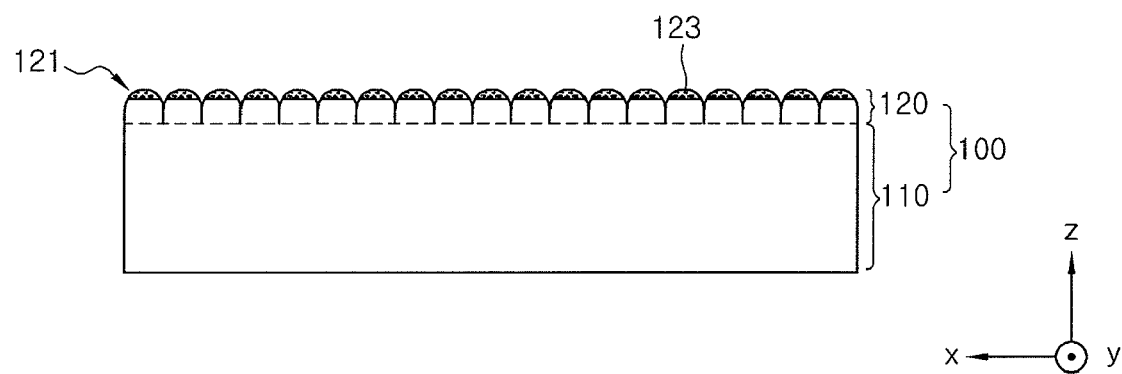
FIGS. 1A to 1E are sectional views of optical plates according to several embodiments of the present invention.

Hereinafter, exemplary embodiments of the present invention will be described in detail with reference to the accompanying drawings. These embodiments are provided for illustrative purposes and for full understanding of the scope of the present invention by those skilled in the art. Throughout the drawings, like reference numerals are used to designate like elements.

FIGS. 1A to 1E are sectional views of optical plates according to several embodiments of the present invention.

Each of the these views is a schematic view, in which the size and shape of each portion is exaggerated for convenience of illustration.

Referring to FIG. 1A, an optical plate 100 according to a first embodiment of the present includes a base material layer 110 and a lens portion 120 having a plurality of unit lenses 121 with a convex shape formed on one surface of the base material layer 110. A diffusion portion is formed in each of the unit lenses 121. The optical plate 100 may have a thickness of about 0.8 to about 1.6 mm.

The base material layer 110 may be formed of a light transmissive resin, such as a thermoplastic resin, or an opaque resin. An additive for maintaining the mechanical and optical stability of an optical plate may be further added in the base material layer 110. For example, the additive may include at least one selected from the group comprising an ultraviolet absorbent, an infrared absorbent, an antioxidant, a heat stabilizer, a selective wavelength absorbent, a flame retardant, a plasticizer, a stabilizer, a lubricant, a coloring agent, a fluorescent bleaching agent and an antistatic agent. The base material layer 110 may be about 80% to about 99.9% of the total thickness of the optical plate 100. The light-transmissive thermoplastic resin of the base material layer 110 may be at least one selected from the group comprising an acryl-based resin, a styrene-based resin, a methyl methacrylate-styrene copolymer resin, a polycarbonate-based resin and an olefin-based resin. The light-transmissive thermoplastic resin may include any one of polycarbonate (PC), polystyrene resin (PS), polyethylene terephthalate (PET), polyarylate (PAR), polysulfone resin (PSU), polyethersulfone resin (PES), polypropylene (PP), polyamide (PA), polyphenylene sulfide (PPS), polyimide resin (PI), poly ether-ether-ketone (PEEK), polyurethane resin (PUR), polyvinyl chloride (PVC), methylpentane polymer (PMP), polymethylmethacrylate (PMMA), silicon resin (SI), acryl-based resin and a fluorine resin.

The lens portion 120 is formed in a z-direction on top of the base material layer 110. The lens portion 120 has the plurality of unit lenses 121 densely gathered on the top surface of the base material layer 110, and each of the unit lenses 121 is formed in a lenticular shape, i.e., convex shape. The diffusion portion is provided in an upper portion of each unit lens 121. A light diffusing agent 123 may be distributed in the diffusion portion. The lens portion 120 includes the diffusion portions and regions in which the light diffusing agent 123 is not distributed. The respective unit lenses 121 may be arranged in the form of a line extending in a y-direction, or may be arranged in the form of discontinuous regular points or irregular points.

The light diffusing agent 123 is distributed in the diffusion portion to scatter the light passing through the lens portion 120 of the base material layer 110, specifically through the diffusion portion thereof. The light diffusing agent 123 may be at least one selected from the group comprising silicone-based crosslinked particles, acryl-based crosslinked particles, styrene-based crosslinked particles, methyl methacrylate-styrene copolymer(MS)-based crosslinked particles, calcium carbonate, barium sulfate, aluminum hydroxide, titanium oxide, talcum and glass beads. The light diffusing agent 123 for a high transmittance and high diffusibility may be silicone-based crosslinked particles, acryl-based crosslinked particles, styrene-based crosslinked particles, methyl methacrylate-styrene copolymer(MS)-based particles, calcium carbonate or talcum. The refractive index of the light diffusing agent 123 is about 1.40 to about 2.40. Each of the aforementioned materials may be used solely, or a plurality of the aforementioned materials may be used together. The average particle diameter of the light diffusing agent 123 may be about 1 to about 50 μm.

Figure 1B:
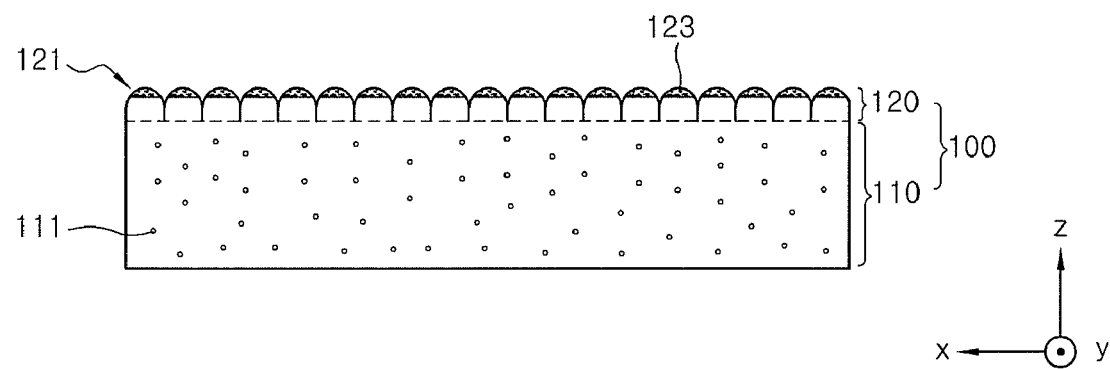

Referring to FIG. 1B, an optical plate 100 according to a another embodiment of to the present invention includes a base material layer 110 in which a light diffusing agent 111 is distributed, and a lens portion 120 having a plurality of unit lenses 121 formed on one surface of the base material layer 110, wherein each of the unit lenses 121 has a convex shape. A diffusion portion is provided in an upper portion of each of the unit lenses 121.

In this embodiment of the present invention, the optical plate 100 has a structure in which the light diffusing agent 111 is distributed in the base material layer 110. The light diffusing agent 111 distributed in the base material layer 110 scatters the light passing through the base material layer 110, and may be at least one selected from the group comprising silicone-based crosslinked particles, acryl-based crosslinked particles, styrene-based crosslinked particles, methyl methacrylate-styrene copolymer-based particles, calcium carbonate, barium sulfate, aluminum hydroxide, titanium oxide, talcum and glass beads. Alternatively, the light diffusing agent 111 may be the same as the light diffusing agent 123 distributed in the diffusion portion. It will be apparent that the light diffusing agent 111 may be different from the light diffusing agent 123. For example, the light diffusing agent 111 for increasing light scattering power may be used in the base material layer 110, and a separate light diffusing agent 123 different from the light diffusing agent 111 of the base material layer 110 may be selected to control a gloss level.

Each of the optical plates 100 according to the embodiments of FIGS. 1 and 2 may be a single-layered plate containing the aforementioned light transmissive thermoplastic resin or a multi-layered plate for high functionality, i.e., a multi-layered plate in which a film layer to be described later are laminated on at least one surface of the base material layer 110.

Figure 1C:
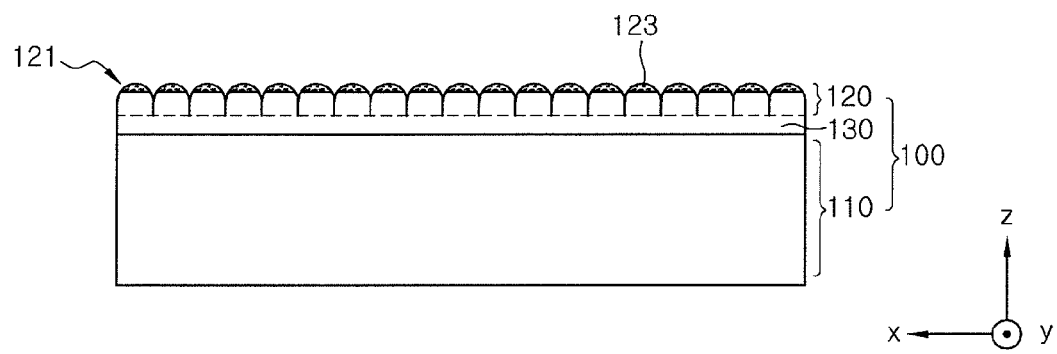

Referring to FIG. 1C, an optical plate 100 according to another embodiment of the present invention includes a first film layer 130 formed on one surface of a base material layer 110, and a lens portion 120 having a plurality of unit lenses 121 formed on the first film layer 130. Each of the unit lenses 121 has a convex shape in a direction of one surface of the lens portion 120 opposite to the other surface thereof in contact with the base material layer 110. A diffusion portion is provided in an upper portion of the unit lens 121.

The first film layer 130 may be formed on any one surface of the base material layer 110 and formed of a light transmissive resin that is the same material as the base material layer 110. It will be apparent that the first film layer 130 is not limited thereto but may be formed of a light transmissive resin that is a different material from the base material layer 110. For example, a resin with high heat-resistance temperature may be used as the base material layer 110, and a resin with low heat-resistance temperature but excellent film formability may be used as the first film layer 130. Alternatively, a high-absorbent resin may be used as the first film layer 130, and a low-absorbent or high-intensity resin may be used as the base material layer 110. That is, a variety of combinations of resins may be possible. Like the base material layer 110, at least one selected from the group comprising an ultraviolet absorbent, an infrared absorbent, an antioxidant, an electromagnetic shielding material, a heat stabilizer, a selective wavelength absorbent, a flame retardant, a plasticizer, a stabilizer, a lubricant, a coloring agent, a fluorescent bleaching agent and an antistatic agent may be added to the first film layer 130 of this embodiment. The first film layer 130 may be formed so that its thickness is about 0.01 to about 10% of the total thickness of the optical plate 100. It will be apparent that the first film layer 130 may be formed to have a single layered structure or a multi-layered structure to have various functions. Also, the first film layer 130 may be laminated on a single surface of the base material layer 110, or both surfaces thereof, which will be described later, and the number of the laminated layers may vary depending on a surface of the base material layer 110.

In addition, the lens portion 120 is formed on top of the first film layer 130 in a z-direction, more specifically, in a direction of one surface of the lens portion 120 opposite to the other surface thereof in contact with the base material layer 110. The lens portion 120 includes the plurality of unit lenses 121 densely gathered on the top surface of the first film layer 130, and each of the unit lenses 121 is formed in a lenticular shape, i.e., a convex shape. Also, a diffusion portion is provided in an upper portion of each unit lens 121. A light diffusing agent 123 may be distributed in the diffusion portion. The respective unit lenses 121 may be arranged in the form of a line extending in a y-direction, or in the form of discontinuous regular or irregular points.

Figure 1D:
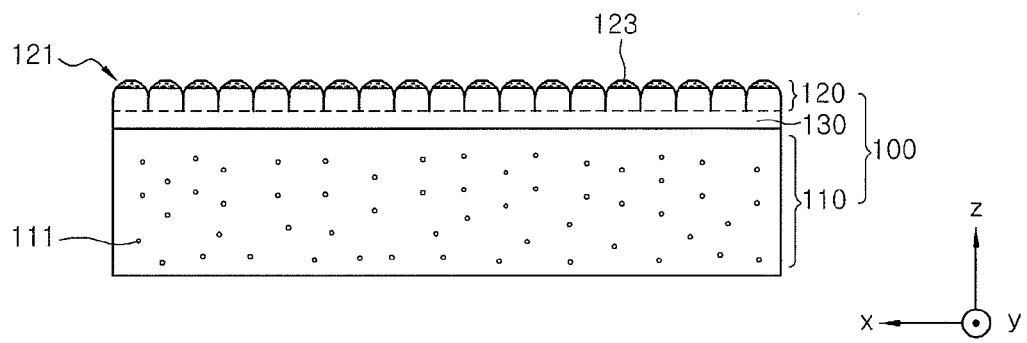

Referring to FIG. 1D, an optical plate 100 according to another embodiment of the present invention includes a first film layer 130 formed on one surface of a base material layer 110 in which a light diffusing agent 111 is distributed, and a lens portion 120 having a plurality of unit lenses 121 formed on the first film layer 130. Each of the unit lenses 121 has a convex shape in a direction of one surface of the lens portion 120 opposite to the other surface thereof in contact with the base material layer 110. A diffusion portion is provided in an upper portion of each unit lens 121.

Figure 1E:
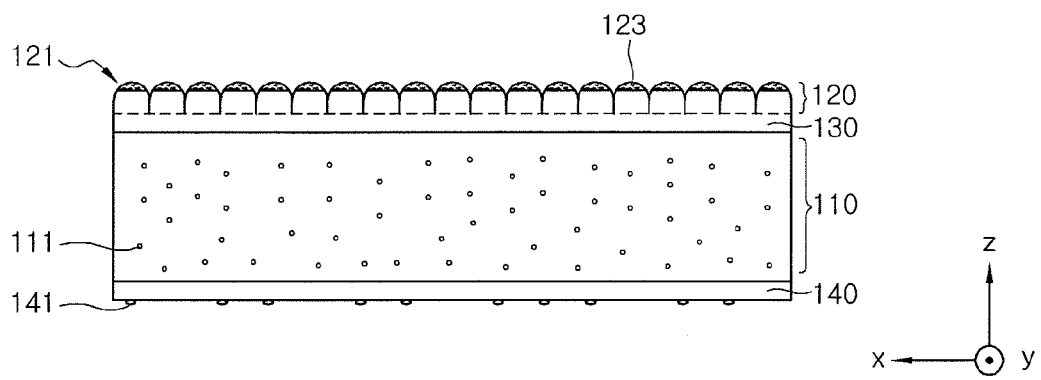

Referring to FIG. 1E, an optical plate 100 according to another embodiment of the present invention includes a first film layer 130 formed on one surface of a base material layer 110, and a lens portion having a plurality of unit lenses 121 formed on the first film layer 130. Each of the unit lenses 121 has a convex shape in a direction of one surface of the lens portion 120 opposite to the other surface thereof in contact with one surface of the base material layer 110. A diffusion portion is provided in an upper portion of each unit lens 121. A second film layer 140 may be formed on the other surface of the base material layer 110.

The second film layer 140 may be formed on the other surface of the base material layer 110, and the components and properties of the second film layer 140 may be the same as or similar to those of the first film layer 130. The second film layer 140 may also contain a light diffusing agent like the first film layer 130. The light diffusing agent may be the same as to or different from the light diffusing agent 111 or 123. Random embossed portions 141 may be formed on one surface of the second film layer 140 opposite to the other surface thereof in contact with the base material layer 110.

The random embossed portions 141 are irregularly distributed on the other surface of the second film layer 140. When the optical plate 100 is supported by supporters (not shown) or the like, the random embossed portions 141 are used to reduce physical contact resistance to the supporters, i.e., damage of the optical plate 100 due to the contact with the supporters. The average roughness of the random embossed portions 141 on the second film layer 140 may be about 2 to about 3.5. If the average roughness of the random embossed portions 141 exceeds 3.5, a large amount of incident light is scattered due to excessive roughness conditions, whereby the light efficiency may be lowered. If the average roughness of the random embossed portions 141 is below 2, the optical plate 100 may be damaged when the optical plate 100 comes into contact with the supporter. The random embossed portions 141 may be formed integrally with the second film layer 140 or adhere to the second film layer 140. The random embossed portions 141 are formed integrally with the second film layer 140 if considering optical characteristics of the optical plate 100. The random embossed portions 141 may be formed integrally with the second film layer 140 by a stamping or extruding method.

In the structures described in FIGS. 1A and 1C, since the light diffusing agent 123 is not distributed in the base material layer 110 but distributed only in the lens portion 120, it is possible to reduce the amount of the light diffusing agent 123 to be used as compared with a conventional structure. In a conventional structure in which the light diffusing agent 123 is distributed in the base material layer 110, the cost of the light diffusing agent is generally about 10 to about 15% of the total cost of the optical plate 100. However, when the structure as described in FIG. 1A is applied, the cost of the light diffusing agent 123 can be reduced. Although the light transmittance of the base material layer 110 having the light diffusing agent 123 distributed therein is reduced to about 50% to about 60% as compared with about 85% to about 92% of the light transmittance of a general base material layer, such reduction of the light transmittance can be improved by means of a structure in which the light diffusing agent 123 is not distributed in the base material layer 110 but distributed only in a portion of the lens portion 120.

In the structures described in FIGS. 1B, 1D and 1E, the light diffusing agent 123 is distributed in the base material layer 110 and the lens portion 120, so that the light scattering power can be improved. As will be described later, such improvement of the light scattering power will be able to reduce the number of light sources, the number of optical sheets to be used, and a gap between the light sources and the optical plate 100.

The optical plates 100 according to embodiments of the present invention may be manufactured using a method of manufacturing a thermoplastic resin, such as a casting, injecting, extruding or co-extruding method.

A casting method is a forming method in which a thermoplastic resin is polymerized and solidified to have a plate shape in a pair of molds, typically between glass or stainless steel plates. An extruding method is a forming method in which a thermoplastic resin is heated and melted in an extruder, extruded from a mold with a sheet-shaped sleeve, i.e., a die, and then inserted between grinding rolls to thereby be formed in the shape of a plate. A co-extruding method is a simple method for forming a multi-layered plate, in which thermoplastic resins are laminated and extruded from a stack die for overlapping a plurality of molten resin streams, e.g., a feed-block die or a multi-manifold die, using a plurality of extruders and then inserted between grinding rolls to thereby be formed in the shape of a plate. It will be apparent that a film may be formed on the resin plate manufactured through the aforementioned methods by a laminating, coating or painting process.

FIGS. 2A to 2D are views showing unit lenses of an optical plate according to an embodiment of the present invention. FIGS. 2A to 2D show the unit lenses 121 of the lens portion 120 of FIG. 1, in which an arbitrary imaginary line is added for convenience of illustration.

Figure 2A:
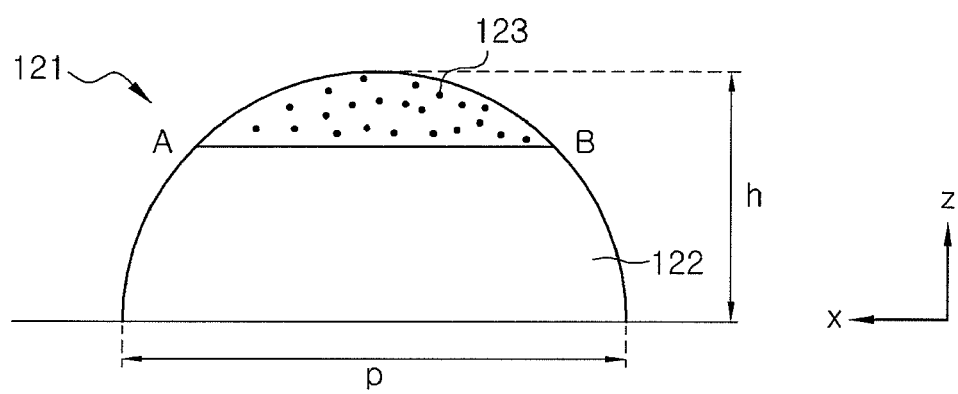
FIGS. 2A to 2D are views showing unit lenses of an optical plate according to an embodiment of the present invention.

Referring to FIG. 2A, in the lens portion 120, the unit lens 121 is formed in an elliptic shape, and the light diffusing agent 123 is distributed in the upper portion of the unit lens 121 to form the diffusion portion. The major radius of the unit lens 121 may be about 1.4 to about 1.85 times of the minor radius of the unit lens 121. If the major radius is below 1.4 times of the minor radius, the unit lens 121 is formed in an almost circular shape, and therefore, less light diffusion may occur then desired. If the major radius exceeds 1.85 times of the minor radius, the path of light in the unit lens 121 is lengthened, and therefore, light efficiency may be lowered and light loss may also occur. However, a ratio of the major radius to the minor radius is not limited thereto. That is, the ratio may be modified through combination of other light-related members. For example, a height h of the unit lens 121 may be about 50 to about 140 μm. If the height h of the unit lens 121 is below 50 μm, a light path of light passing through the unit lens 121 will be too short for the light to be sufficiently diffused. If the height h of the unit lens 121 exceeds 140 μm, the light path is lengthened, and therefore, light efficiency may be lowered and light loss may also occur. A pitch p of the unit lens 121 may be about 150 to about 250 μm. If the pitch p of the unit lens 121 is below 150 μm, it is difficult to form the light diffusing agent 123 in a desired portion of the unit lens 121 due to the small size. If the pitch p of the unit lens 121 exceeds 250 μm, light efficiency may be lowered due to the excessive pitch p.

A non-diffusion portion 122 exists under the diffusion portion in which the light diffusing agent 123 is distributed. The non-diffusion portion 122 is formed integrally with the base material layer 110 (FIGS. 1A and 1B) or the first film layer 130 (FIGS. 1C to 1E), and has the same properties as the base material layer 110 (FIGS. 1A and 1B) or the first film layer 130 (FIGS. 1C to 1E). The non-diffusion portion substantially extends from the base material layer 110 (FIGS. 1A and 1B) or the first film layer 130 (FIGS. 1C to 1E). Here, light is incident on and exits from the unit lens 121 in a z-direction.

The weight of the light diffusing agent 123 in the diffusion portion may be about 4% or less of the weight of the diffusion portion. The volume of the light diffusing agent 123 may be about 2% or less of the volume of the diffusion portion. If the weight of the light diffusing agent 123 exceeds 4% of the weight of the diffusion portion or the volume of the light diffusing agent 123 exceeds 2% of the volume of the diffusion portion, the light radiation efficiency may be lowered due to the excessive distribution of the light diffusing agent 123.

Figure 2B:
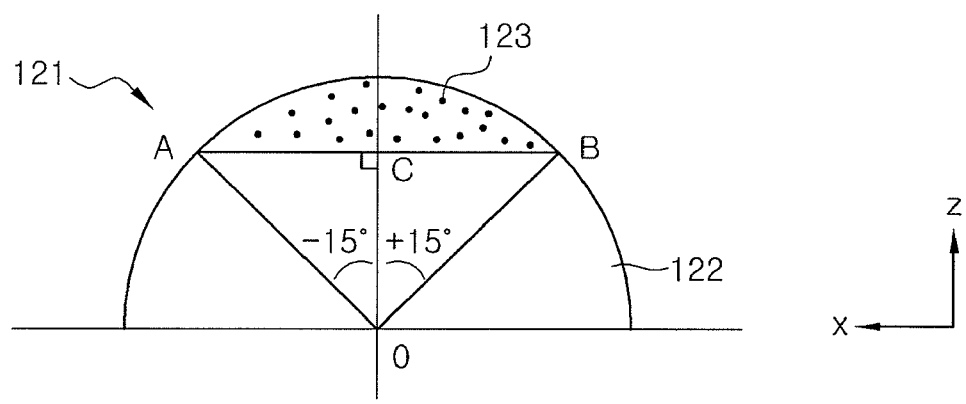

Referring to FIG. 2B, the diffusion portion having the light diffusing agent 123 distributed therein may be formed in a region over a imaginary line AB connecting intersection points A and B at which a surface of the unit lens 121 intersects with lines biased at about ±15 degrees from a center line OC with respect to the center O of the unit lens 121. Since diffusion occurs in a region below the imaginary line AB without the light diffusing agent due to an angle at which light is incident in a direction of an inner surface of the unit lens 121, an additional light diffusing agent is not required. On the other hand, if the light diffusing agent 123 is provided in such a region, the light efficiency may be lowered.

Figure 2C:
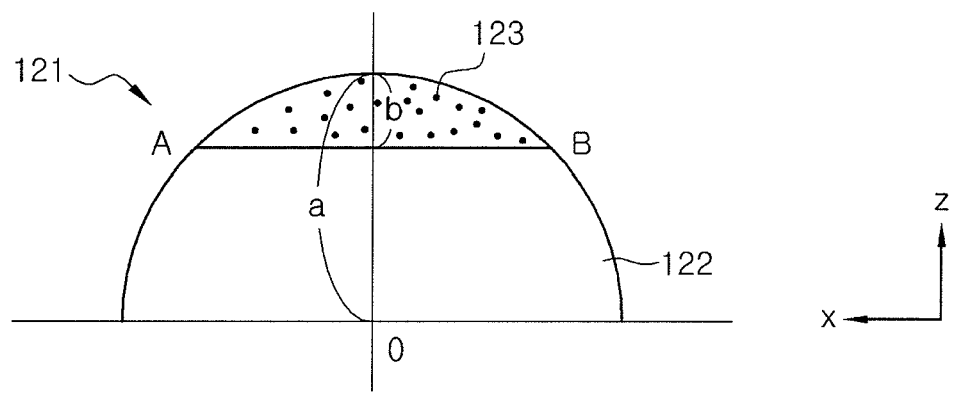

Referring to FIG. 2C, the diffusion portion having the light diffusing agent 123 distributed therein has a height b in the z-direction with respect to a height a of the unit lens 121. The height b is about 20% or less of the height a, i.e., b/a≦0.2. For example, if the height a of the convex portion of the unit lens 121 is 100 μm, the height b may be 15 μm. If the height a is 83 μm, the height b may be 15 μm.

Figure 2D:
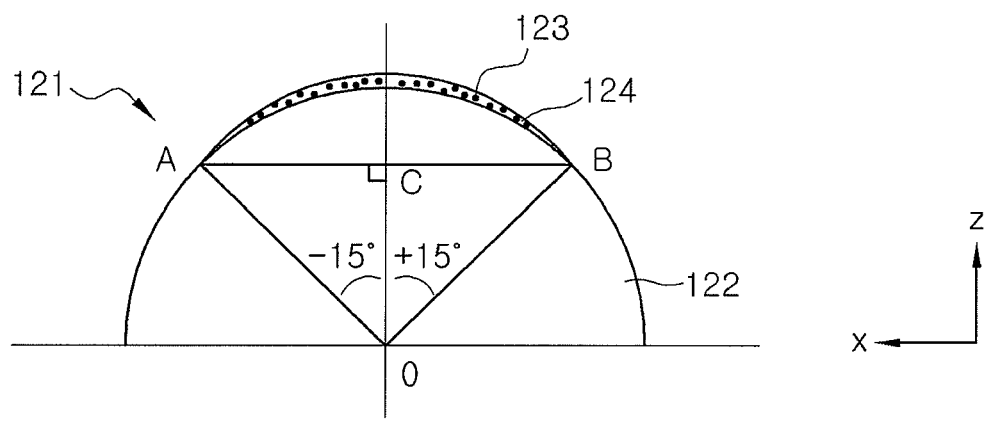

Referring to FIG. 2D, the diffusion portion having the light diffusing agent 123 distributed therein may be formed on an outer surface of an arc, i.e., an arc AB, between intersection points A and B, at which the surface of the unit lens 121 intersects with lines biased at ±15 degrees from a center line OC with respect to the center O of the unit lens 121. The diffusion portion formed as described above may be formed by distributing the light diffusing agent 123 in a separate medium and then applying it to the surface of the unit lens 121. The diffusion portion may be continuously or discontinuously formed in the y-direction on the surface of the unit lens 121, and may be formed by a silk-screening or a partial-dipping method using a mask with a pattern formed thereon. Here, the partial-dipping method is a method in which only a portion of an upper portion of the unit lens 121 protruding in a convex shape at a predetermined height or more is dipped in a liquid such that a predetermined portion from the top point of the convex shape, i.e., the surface of the arc AB is dipped. Such a method may be more effective in view of cost and yield as compared with the methods of forming a diffusion portion as described in FIGS. 2A to 2C.

Since diffusion occurs in a region beyond the arc AB without the light diffusing agent due to an angle at which light is incident in a direction of an inner surface of the unit lens 121, an additional light diffusing agent is not required, and thus, the diffusion portion may be formed only on the arc AB. If the light diffusing agent 123 is provided beyond the arc AB, the light efficiency may be lowered.

FIGS. 3A to 3H are views showing modifications of the unit lenses of the optical plates according to embodiments of the present invention.

Figure 3A:
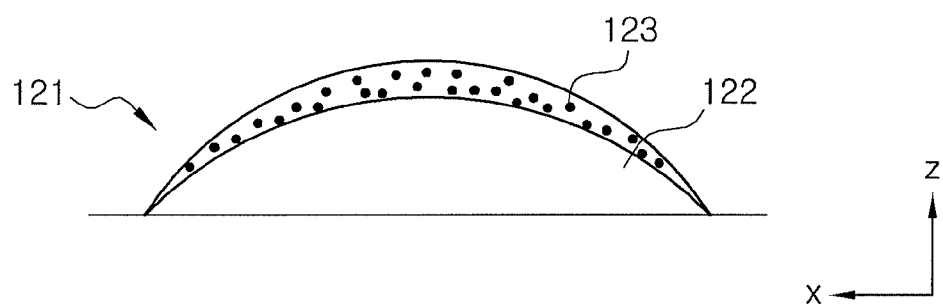
FIGS. 3A to 3H are views showing modifications of the unit lenses of the optical plate according to an embodiment of the present invention.

Referring to FIG. 3A, in a modification according to an embodiment of the present invention, a diffusion portion is formed under a surface of a unit lens 121. That is, a light diffusing agent 123 is distributed under the surface of the unit lens 121. Unit lenses 121 in FIGS. 3A to 3E have substantially the same shape as the unit lenses 121 in FIGS. 2A to 2D except for distribution phases of the light diffusing agent 123. Diffusion portions in FIGS. 3A to 3E have a different shape from the diffusion portions in FIGS. 2A to 2D.

Figure 3B:
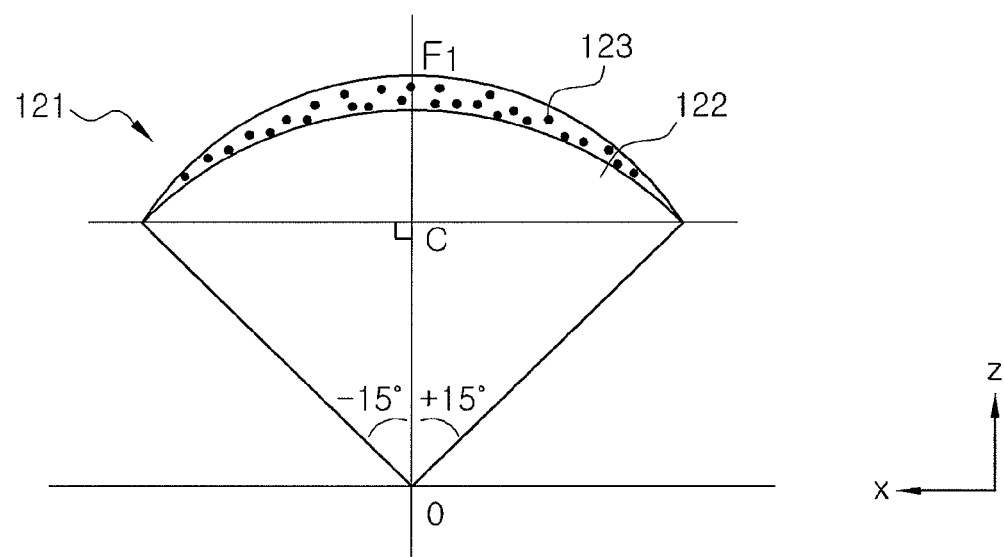

The light diffusing agent 123 is distributed in an inner surface of the unit lens 121 therealong. The light diffusing agent 123 may be distributed thicker at a central portion of the unit lens 121 in a light emitting direction and thinner at a peripheral portion thereof. Such a configuration makes the required light diffusion possible because light diffuses at the peripheral portion of the unit lens 121 in accordance with a desired property even without the light diffusing agent 123, and the light diffusing agent 123 is gathered relatively densely at the center portion of the unit lens 121 to allow the light diffusion to occur. That is, the diffusion portion may be formed in a crescent shape under the surface of the unit lens 121. However, as shown in FIG. 3B, the diffusion portion may not extend to a region beyond lines inclined at ±15 degrees from a center line 0F with respect to the center 0 of the unit lens 121 as described with reference to FIGS. 2A to 2E.

Figure 3C:
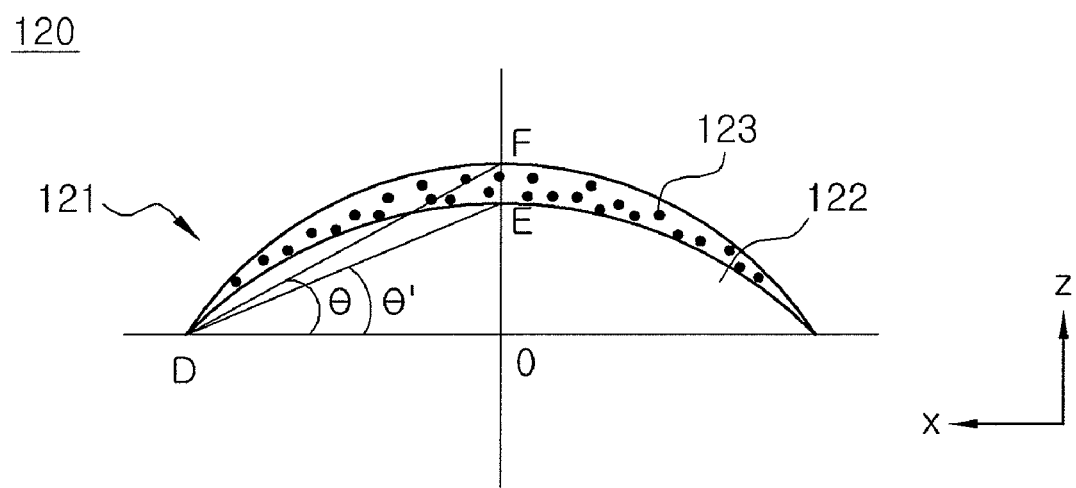

Referring to FIG. 3C, an angle Θ between a reference line OD passing the center O in the x-direction of a unit lens 121 and a line DF from an intersection point D of the reference line OD and a surface of the unit lens 121 to an intersection point F of a center line OF passing the center O in the z-direction of the unit lens 121 and the surface of the unit lens 121 may be greater than an angle Θ' between the reference line OD and a line DE from the intersection point D of the reference line OD and an interface of the diffusion portion and the unit lens 121 to an intersection point E of the center line OF and the interface, i.e., Θ>Θ'. In this case, the length of the line DF is greater than that of the line DE. The distance from the point D to the highest point of the unit lens 121, i.e., the point F, is greater than the distance from the point D to the point E. Here, the lowest point of the diffusion portion is not always the point E, but such a relation can be established although an arbitrary lowest point is set in the diffusion portion. In this case, as described above, the diffusion portion may be formed in a crescent shape in which the diffusion portion under the unit lens 121 on the center line OF is thickest, and the diffusion portion becomes thinner in the ±x-direction.

Figure 3D:
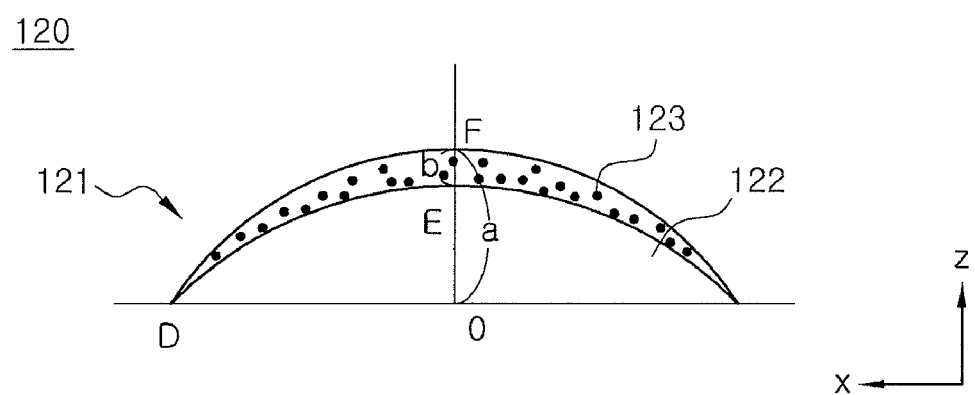

A thickness of a diffusion portion in a unit lens 121 may be about 20% or less of a height a (OF) of the unit lens 121. That is, as shown in FIG. 3D, a thickness b (EF) of the thickest part of the diffusion portion on the center line OF may be about 20% or less of the height a (OF) of the unit lens 121. In FIG. 3D, the diffusion portion may be formed in a crescent shape in which the diffusion portion becomes thinner in the ±x-direction.

Figure 3E:
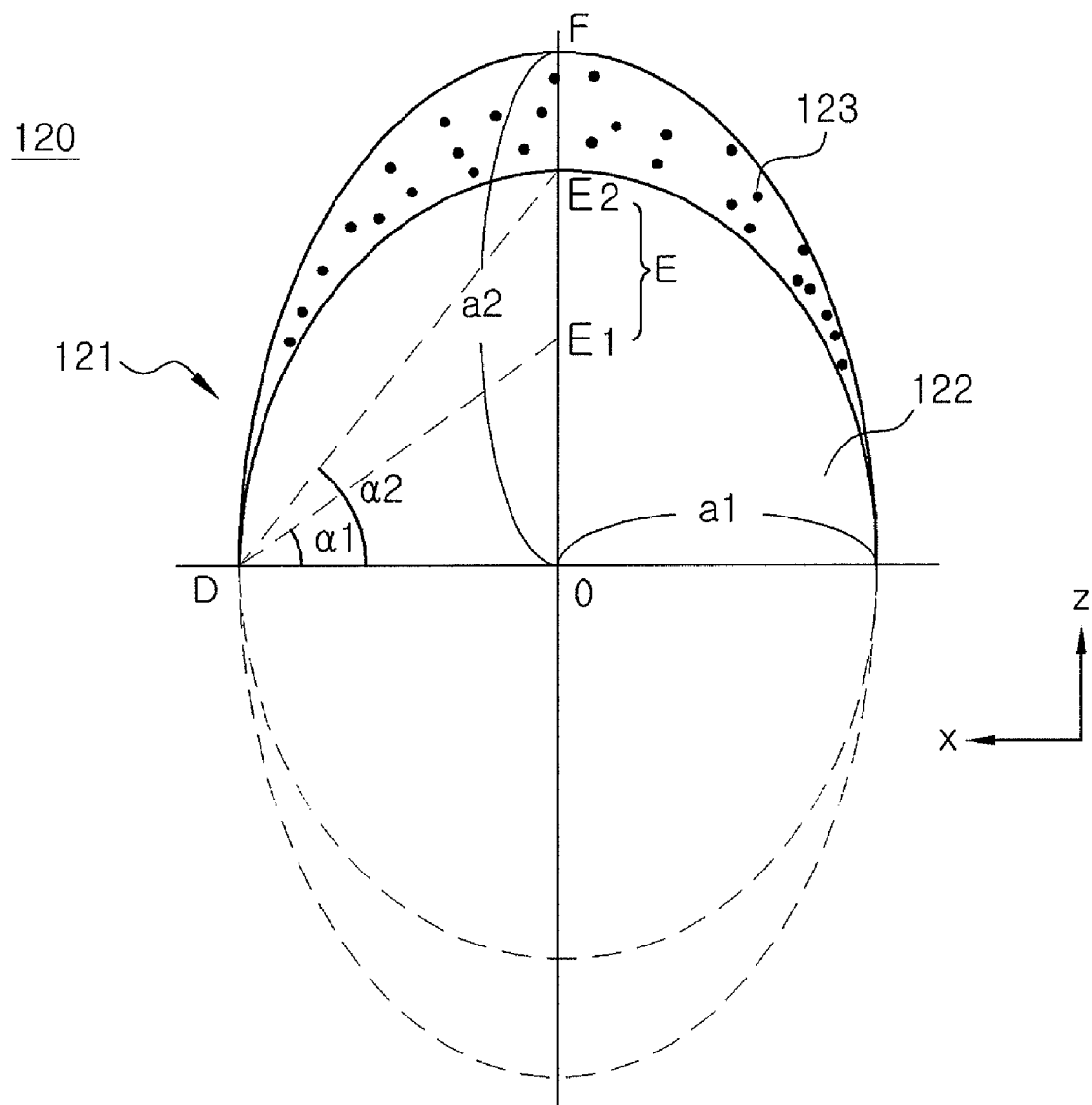
Figure 3F:
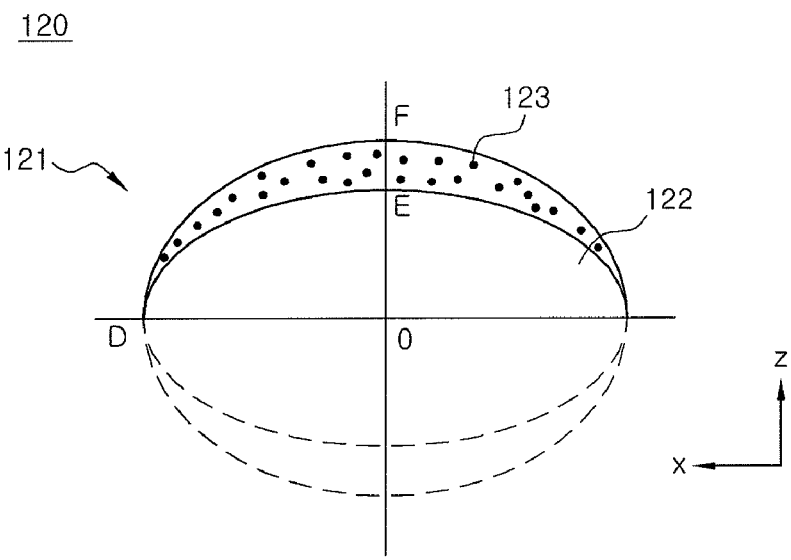

An elliptic shape may be used as an example of the aforementioned crescent shape. That is, as shown in FIG. 3E or 3F, a diffusion portion may have a shape in which an interface of the diffusion portion and a unit lens 121 satisfies the equation of an ellipse. In FIG. 3E, the major radii a2 of the unit lens 121 and a non-distribution area 122 are arranged in the z-direction, and the minor radii a1 of the unit lens 121 and the non-distribution area 122 are arranged in the x-direction. In FIG. 3F, the major radii of a unit lens 121 and a non-distribution area 122 are arranged in the x-direction, and the minor radii of the unit lens 121 and the non-distribution area 122 are arranged in the z-direction. In each case, the diffusion portion has a shape in which the diffusion portion on center line OF is thickest. The major radius a2 of the elliptic unit lens 121 may be about 1.4 to about 1.85 times of the minor radius a1 of the unit lens 121 in FIG. 3E. If the major radius a2 is below 1.4 times of the minor radius a1, the shape of the unit lens 121 is close to a circular shape, and therefore, and less light diffusion may occur than desired. If the major radius a2 exceeds 1.85 times of the minor radius a1, the path of light in the unit lens 121 is lengthened, and therefore, light efficiency may be lowered and light loss may also occur. A centerline of a light diffusing agent 123 corresponds to a segment EF in the unit lens. An extension line having an inclination angle α1/α2 with respect to a reference line OD intersects with centerline 0F of the unit lens 121 at an intersection point E1/E2. For example, the intersection point falls on E1 when α is 36 degree (α1), and the intersection point falls on E2 when α is 45 degree (α2) as described in FIG. 3E. Here, the angle α may be in a range of about 36 to about 45 degrees. That is, the segment EF may be longer than E2F and shorter than E1F. If the angle α is below 36 degrees, the light diffusing agent 123 is excessively distributed in the unit lens 121, and therefore causing light scattering and increased light loss. On the other hand, if the angle α exceeds 45 degrees, light scattering power may be decreased. In any structure of FIG. 3E or 3F, an interface between the diffusion portion and the unit lens 121 has an elliptic shape. However, the diffusion portion under the unit lens 121 on the center line OF may be thickest, and the diffusion portion may be thinner as it goes in the ±x-direction, as described above.

Figure 3G:
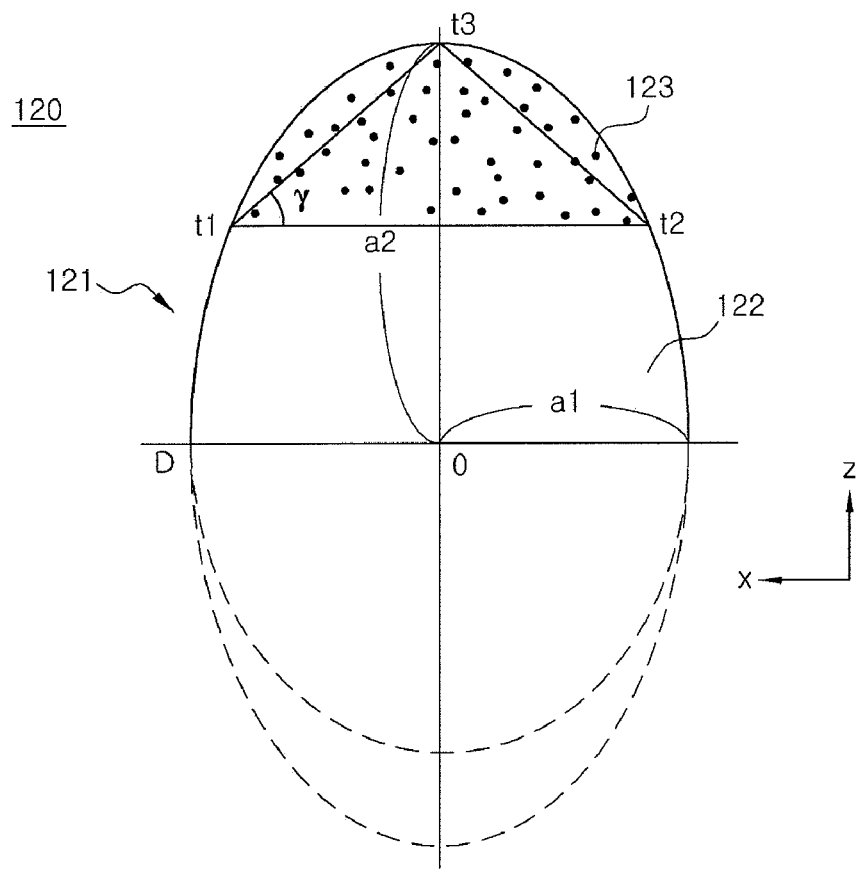

Referring to FIG. 3G, in an elliptic unit lens 121, of which the major radius a2 is about 1.4 to about 1.85 times of the minor radius a1, a light diffusing agent 123 may be formed in a region over a base side t1t2 parallel with a reference line OD. The base side t1t2 constitute a triangle together with an intersection point t3 at which an extension line making angle γ at point t1 intersects with the center line OF (FIG. 3E), i.e., the highest point of the unit lens 121. In this case, the triangle is an isosceles triangle. That is, the length of line t1t3 is the same as that of line t2t3. Here, the angle γ may be 36 to 45 degrees, angle t1t3O may be 45 to 54 degrees, and angle t1t3t2 may be 90 to 108 degrees. If the angle γ is smaller than 36 degrees, the base side t1t2 moves up in the +z-direction, reducing a region having the light diffusing agent 123 distributed, and therefore, decreasing light scattering power to an insufficient level. If the angle γ is larger than 45 degrees, the base side t1t2 moves down in the −z-direction, in which the light diffusing agent 123 is excessively distributed, and therefore causing excessive light scattering and increased light loss.

Figure 3H:
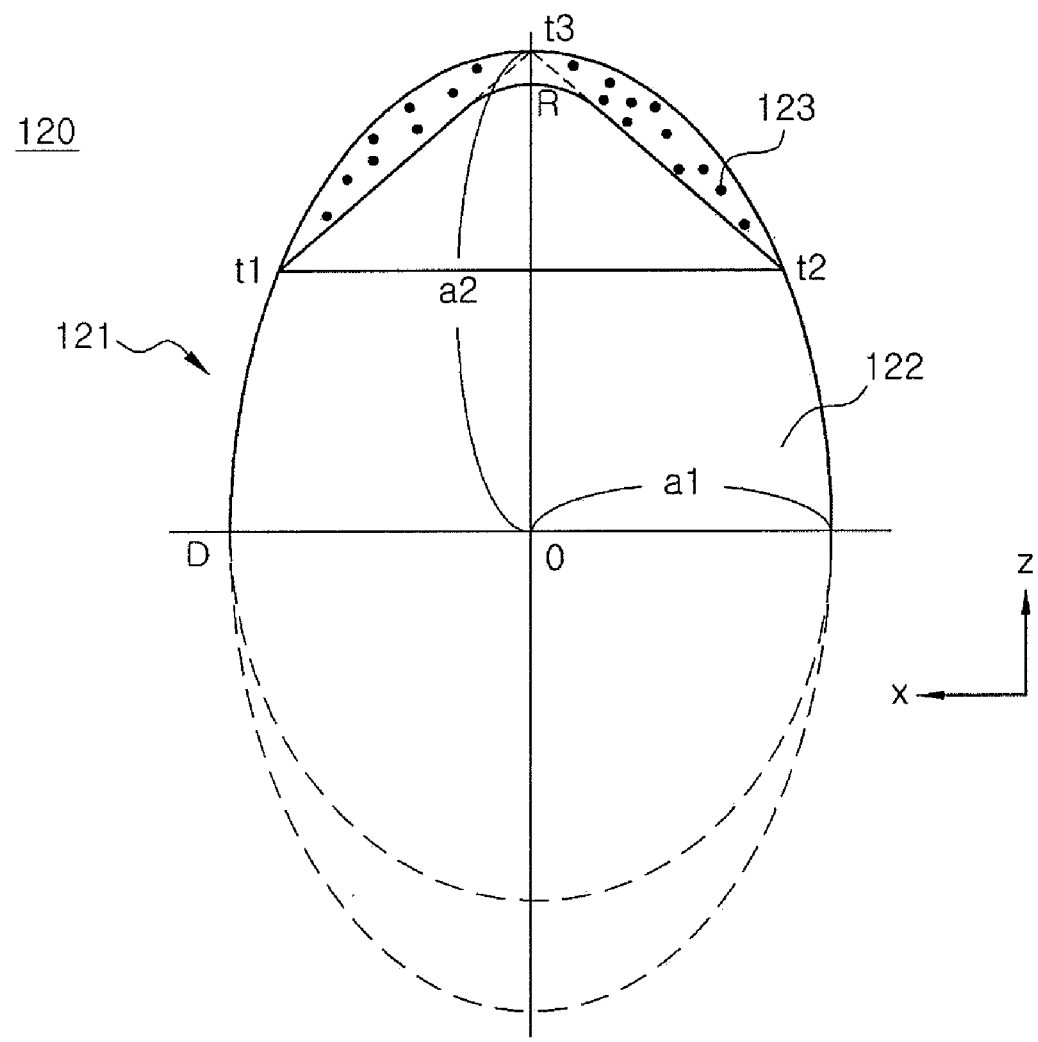

FIG. 3H shows that the point t3 in the isosceles triangle t1t2t3 of FIG. 3G is curved to form a curved point R, which is positioned below the point t3. A light diffusing agent 123 may be formed in an area defined by an arc t1t3t2 of a unit lens 121 and a line t1Rt2. As shown in FIG. 3H, a diffusion portion having the light diffusing agent 123 distributed therein may be a modification of the aforementioned crescent shape.

Figure 4:
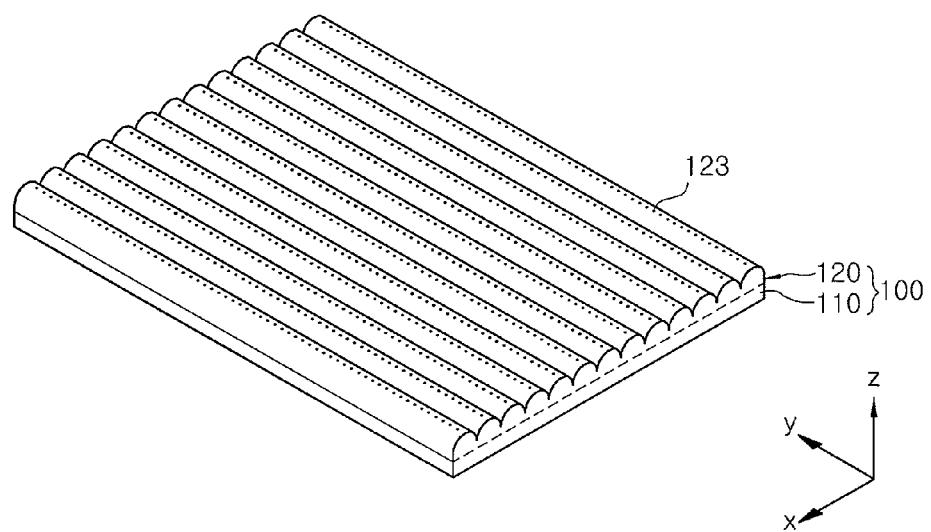
FIG. 4 is a perspective view of an optical plate according to another embodiment of the present invention.

FIG. 4 is a perspective view of an optical plate according to another embodiment of the present invention.

Referring to FIG. 4, an optical plate 100 has a lens portion 120 formed on a base material layer 110, and a light diffusing agent 123 is applied to the lens portion 120. The light diffusing agent 123 is intermittently applied in the ±y-direction on a surface of the lens portion 120. In FIG. 4, a cross section of the unit lens 121 has substantially the aforementioned shape of FIG. 2D. To form a diffusion portion as shown in FIG. 4, there are provided the steps of preparing the base material layer 110 having the lens portion 120 formed thereon and applying the light diffusing agent 123 to the lens portion 120. The base material layer 110 with the lens portion 120 formed thereon may be manufactured by an extrusion or injection molding process.

The light diffusing agent 123 applied to the lens portion 120 may be intermittently applied in the ±y-direction. It will be apparent that the application of the light diffusing agent is not limited thereto, but the light diffusing agent may be continuously applied in the ±y-direction. The light diffusing agent 123 may be formed by a silk-screening method. When the light diffusing agent 123 is formed by a silk-screening method, the light diffusing agent 123 may be applied over the entire area of the x-y plane at a time or may be sequentially applied in the ±y-direction on respective unit lenses 121 along the pitch of the unit lenses 121. When the light diffusing agent 123 is applied by a silk-screening method, the light diffusing agent 123 may be applied intermittently or continuously. The light diffusing agent 123 may be applied by a partial-dipping method instead of a silk-screening method. When light diffusing agent 123 is intermittently applied by a partial-dipping method, an additional step may be required.

Figure 5:
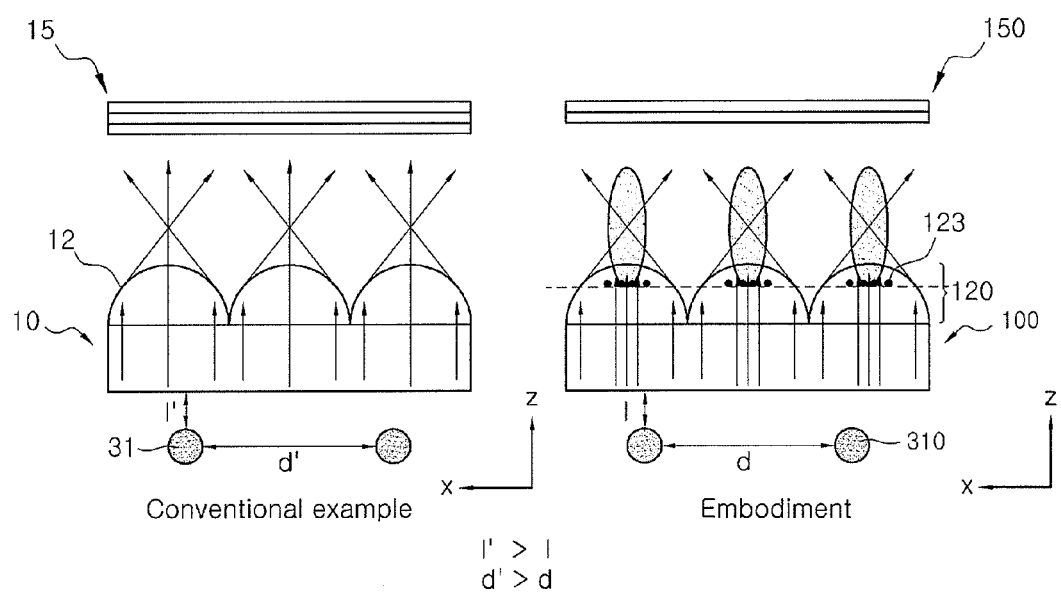
FIG. 5 is a view illustrating a comparison of light paths in the optical plate according to an embodiment of the present invention and a conventional optical plate.

FIG. 5 is a view illustrating a comparison of light paths in an optical plate according to an embodiment of the present invention and a conventional optical plate;

Referring to FIG. 5, in the conventional example, light emitted in the z-direction from a light source 31 is partially diffused when passing through a unit lens 12 of an optical plate 10. However, light passing the center of the unit lens 12 is transmitted to a surface of the unit lens 121 without being diffused. That is, the light incident perpendicular to the unit lens 12 is not refracted or diffused but emitted from the unit lens 12 in the z-direction that is the incident direction of the light. In this case, separate diffusion sheets 15 should be provided to allow light emitted from the light source 31 to be more evenly diffused in the x-direction. In the conventional example, three diffusion sheets 15 are typically disposed.

In an embodiment of the present invention, since light incident perpendicular to an interface of a unit lens 120 in the z-direction is diffused by a light diffusing agent 123, light scattering power is enhanced as compared with the conventional example, and therefore, the number of diffusion sheets 150 can be reduced or omitted as compared with the conventional example. Although two diffusion sheets 150 are shown in FIG. 5 for the purpose of comparison with the conventional example, only one or no diffusion sheet 150 may be provided as described above. If the diffusion sheets 150 are decreased in number or omitted, it will be apparent that the overall thickness of a finally completed product can also be reduced.

In the conventional example, the light sources 31 should be disposed to be spaced apart from each other by a predetermined distance d', and a distance l' between the light source 31 and the optical plate 10 should be set greater than or equal to a predetermined value. That is, if the distance l' therebetween is too short, intensity of light in the z-direction from the light source 31 is too strong in a region directly above the light source and intensity of light in the z-direction is too weak in a region away from the light source 31 in the x-direction, so that the arrangement of the light sources 31, i.e., bright lines, may appear. To address such an issue, occurrence of the bright lines may be prevented by spacing apart the light sources 31 from the optical plate 10 by greater than or equal to the predetermined distance l'. The occurrence of such bright lights may cause decrease light uniformity. As the distance l' between the light source 31 and the optical plate 10 is more distant, the occurrence of the bright lines should be prevented by allowing the distance d' between the light sources 31 to be close, and degradation of light intensity due to the spaced distance l' should be compensated by increasing the number of light sources 31.

However, since in an embodiment of the present invention, light emitted from light sources 310 is diffused more as compared with the convention example, the aforementioned issue can be addressed. That is, although a distance l between the light source 310 and an optical plate 100 is shorter than the distance l' in the conventional example, uniformity can be enhanced without occurrence of bright lines due to the light scattering power of the optical plate 100. Since light intensity viewed due to the distance l shorter than the distance l' in the conventional example is more uniform, luminance can be enhanced. In addition, since the distance l between the light source 310 and the optical plate 100 is shortened, a distance d between the light sources 310 can be lengthened. That is, since luminance is enhanced due to the short spacing distance l, luminance cannot be lowered as compared with the conventional example even though the distance d between the light sources 310 is longer than the distance d' between the light sources 31. Moreover, as the distance d between the light sources 310 becomes longer, the number of light sources 310 can be reduced in a completed product as compared with the conventional example.

Hereinafter, a backlight assembly having the optical plate for a display according to the aforementioned embodiments will be described.

Figure 6:
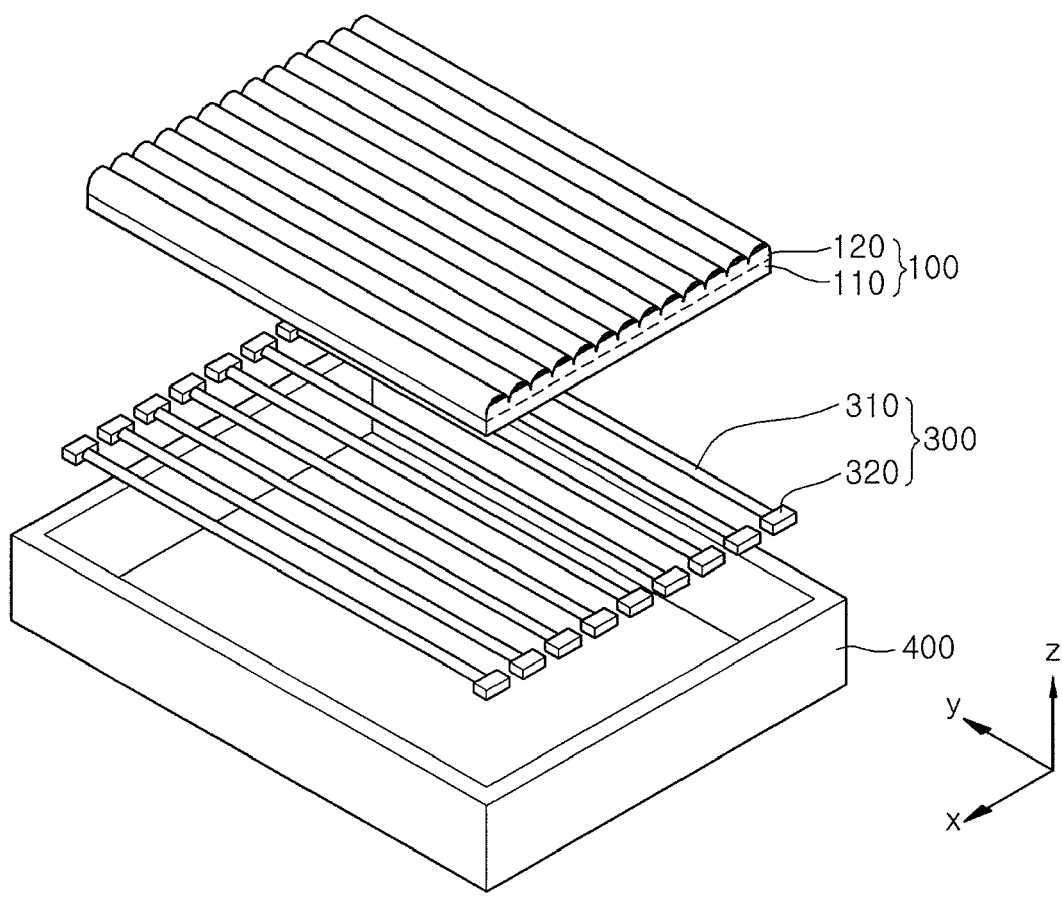
FIG. 6 is a perspective view schematically showing a backlight assembly according to an embodiment of the present invention.
Figure 7:
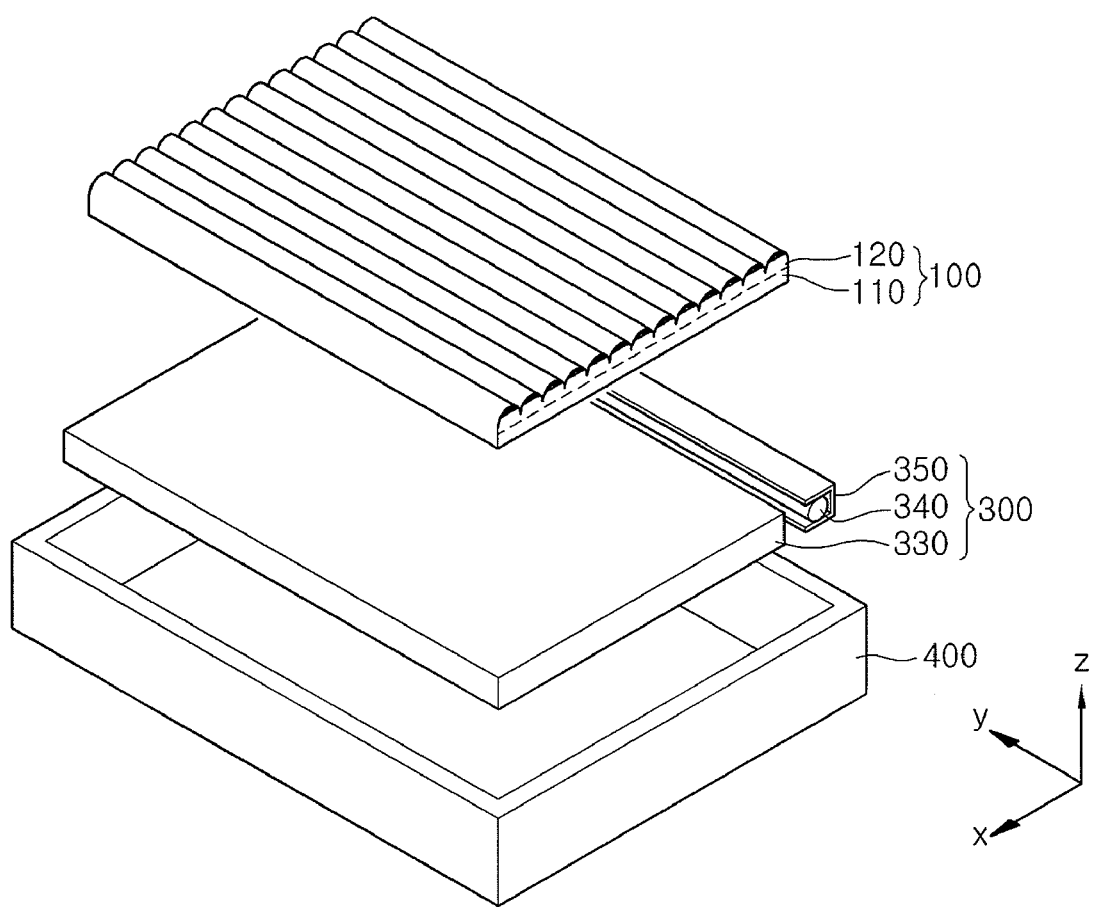
FIG. 7 is a perspective view schematically showing a backlight assembly according to a modification of FIG. 6.

FIG. 6 is a perspective view schematically showing a backlight assembly according to an embodiment of the present invention. FIG. 7 is a perspective view schematically showing a backlight assembly according to a modification of FIG. 6.

Referring to FIG. 6, the backlight assembly according to the embodiment of the present invention includes a light source unit 300, an optical plate 100 provided over the light source unit 300, a receiving member 400 for accommodating the light source unit 300 and the optical plate 100.

The light source unit 300 includes a plurality of lamps 310 and lamp holders 320 provided at both ends of the respective lamps 310 for fixedly supporting the lamps 310. Cold cathode fluorescent lamps (CCFLs) may be used as the plurality of lamps 310. It will be apparent that embodiments of the present invention is not limited thereto. That is, all types of lamps for emitting light having a wavelength band of infrared as well as visible light (i.e., white light) may be used as the plurality of lamps 310. Although not shown, the CCFL includes a glass tube in which a mixed gas of Hg, Ne and Ar is provided, positive and negative electrodes provided at both ends of the glass tube, and a phosphor film applied to an inner surface of the glass tube.

The CCFL emits light having a predetermined wavelength band by allowing electrons radiated through an electric field applied between the positive and negative electrodes to cause a state transition of Hg, and the phosphor emits visible light in response to radiation in the wavelength band emitted by Hg. The light is emitted in a direction of a lens portion 120, i.e., the z-direction, from a base material layer 110.

The optical plate 100 includes the base material layer 110 and the lens portion 120 formed on the base material layer 110. The optical plate 100 allows visible light (i.e., white light) emitted from the light source unit 300 to be uniformly diffused by a light diffusing agent provided in a diffusion portion of the lens portion 120 on the base material layer 110. The optical plate 100 is not limited to the aforementioned structure, and structures of optical plates 100 according to embodiments of the present invention described with reference to FIGS. 1A to 1E may be used as the aforementioned structure.

Referring again to FIG. 6, supporters (not shown) for supporting the optical plate 100 may be provided, and a second film layer 140 (not shown in FIG. 6) having the aforementioned random embossed portions 141 (not shown in FIG. 6) formed thereon is provided in the optical plate 100, so that it is possible to prevent damage of the optical plate 100 caused by physical contact with the supporters. In addition, when the optical plate 100 is large in correspondence with large-sized displays, it is possible to effectively cope with sag of the large optical plate 100 due to its weight.

The lens portion 120 of the optical plate 100 is formed in a line shape in a longitudinal direction of the lamp 310, i.e., in the y-direction, as shown in FIG. 6, which perform effective light diffusion corresponding to the individual lamps 310. However, the lens portion 120 is not limited thereto but may be disposed in a line shape in the x-direction. The optical plate 100 allows effective light diffusion to occur for the line-shaped light source 310, thereby achieving uniform luminance throughout an overall display screen and enhancing efficiency of emitted light.

As shown in FIG. 7, a light source unit 300 of a backlight assembly according to a modification of the embodiment of the present invention may include a light guide plate 330, a lamp 340 provided at one side of the light guide plate 330, and a cover unit 350 for reflecting light emitted from the lamp 340 to the light guide plate 330. The light guide plate 330 is a member for converting light having an optical distribution of a linear light source, which is emitted from the lamp 340, into light having an optical distribution of a surface light source.

Hereinafter, a liquid crystal display (LCD) having a backlight assembly according to an embodiment of the present invention will be described.

Figure 8:
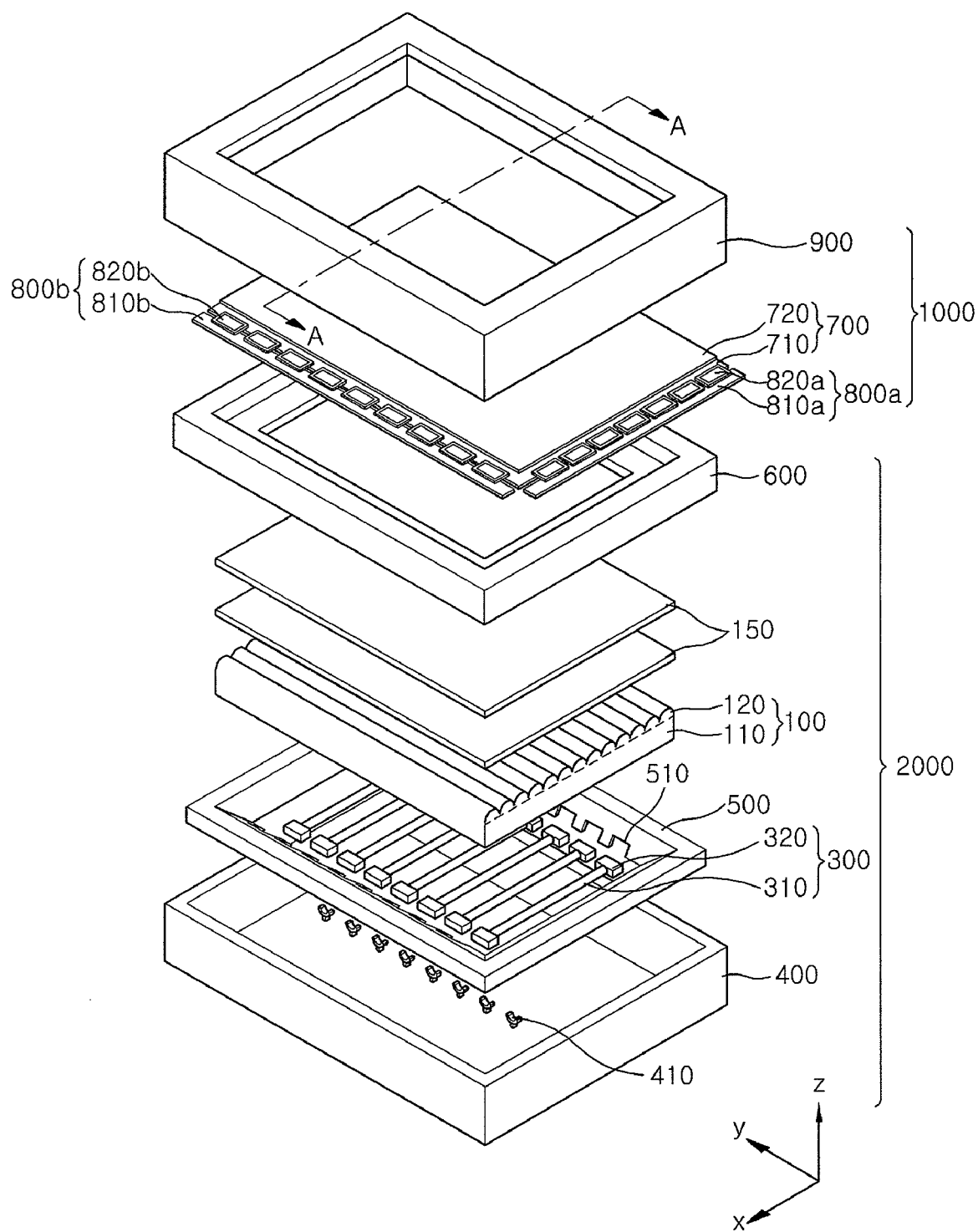
FIG. 8 is a perspective view schematically showing a liquid crystal display according to an embodiment of the present invention.
Figure 9:
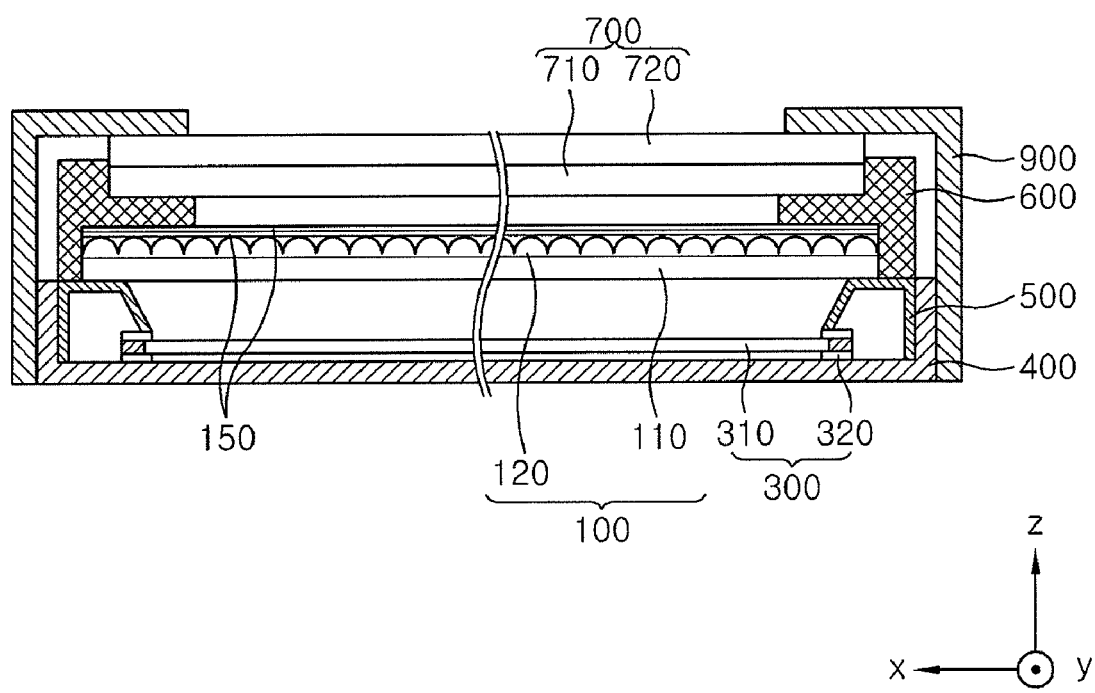
FIG. 9 is a sectional view of the liquid crystal display taken along line A-A in FIG. 8.

FIG. 8 is a perspective view schematically showing an LCD according to an embodiment of the present invention, and FIG. 9 is a sectional view of the LCD taken along line A-A in FIG. 8.

Referring FIGS. 8 and 9, the LCD according to an embodiment of the present invention includes a display assembly 1000 disposed at an upper portion thereof and a backlight assembly 2000 disposed at a lower portion thereof.

The display assembly 1000 includes an LCD panel 700, driving circuit units 800 (800a and 800b), a lower receiving member 400, and an upper receiving member 900.

The LCD panel 700 includes a color filter substrate 720 and a thin film transistor (TFT) substrate 710. The driving circuit units 800 includes a gate-side printed circuit board (PCB) 810a connected to gate lines of the TFT substrate 710 through gate-side flexible PCBs 820a, and a data-side PCB 810b connected to data lines of the TFT substrate 710 through data-side flexible PCBs 820b. The gate-side PCB 810a may be omitted as necessary.

The upper receiving member 900 is formed in the shape of a rectangular frame with planar and sidewall portions perpendicularly bent therefrom to prevent components of the display assembly 1000 from escaping from the LCD and to protect the fragile LCD panel 700 or backlight assembly 2000 against external impact. The planar portion of the upper receiving member 900 supports a portion of an edge of the LCD panel 100 at a lower portion of the planar portion, and the sidewall portions are correspondingly coupled to sidewalls of the lower receiving member 400. The upper and lower receiving members 900 and 400 may be manufactured using a metal with excellent strength, light weight and low deformation.

Next, the backlight assembly 2000 includes a light source unit 300 for generating light, a fixing member 500 for fixedly supporting the light source unit 300, an optical plate 100 disposed over the fixing member 500, optical sheets 150 disposed over the optical plate 100, a supporting member 600 for supporting the optical plate 100 and the optical sheets 150, and the lower receiving member 400 for accommodating the light source unit 300, the fixing member 500, the optical plate 100 and the optical sheets 150.

The light source unit 300 includes a plurality of lamps 310 disposed at the same intervals and lamp holders 320 provided at both ends of the respective lamps 310. In the embodiment of the present invention, the lamps 310 are disposed so that the longitudinal direction of the lamp 310, i.e., the x-direction, is perpendicular to the longitudinal direction of the lower receiving member 400, i.e., the y-direction. It will be apparent that the arrangement of the lamps 310 are not limited thereto, and the lamps 310 may be disposed so that the longitudinal direction of the lamp 310 is parallel with the longitudinal direction of the lower receiving member 400, i.e., the y-direction.

The fixing member 500 is manufactured in the shape of a frame with an open bottom, and a plurality of concave portions 510 for fixedly supporting the lamp holders of the light source unit 300 at one side of the fixing member 500. Accordingly, the fixing member 500 fixedly supports the plurality of lamps 310 of the light source unit 300, thereby preventing the lamps 310 from shaking and protecting the lamps 310 against external impact. It will be apparent that the fixing member 500 is not limited to the aforementioned structure but may be modified in various shapes to fixedly support the plurality of lamps 310 of the light source unit 300.

The optical plate 100 provided over the fixing member 500 includes a base material layer 110 and a lens portion 120 formed in a convex shape on a surface of the base material layer 110.

The base material layer 110 allows light incident from the light source unit 300 to be directed to the front of the LCD panel 700, and diffuses the light to have uniform distribution in a broad range, thereby illuminating the LCD panel 700. The light is emitted in a direction of the lens portion 120, i.e., in the z-direction. Here, the optical plate 100 is not limited to the aforementioned structure, and the structures of the optical plates 100 described with reference to FIGS. 1A to 1E may be used as the aforementioned structure.

The optical sheets 150 may include at least one polarizing sheet, at least one luminance enhancement sheet and at least one diffusion sheet. The polarizing sheet serves to convert light slantingly incident on the polarizing sheet into light that vertically exits therefrom. The luminance enhancement sheet transmits light parallel with a transmission axis of the luminance enhancement sheet and reflects light perpendicular to the transmission axis. The diffusion sheet serves to allow incident light to be diffused and emitted to have an optical distribution of a surface light source. Accordingly, light is incident in a direction perpendicular to the LCD panel 700, thereby enhancing the light efficiency. The optical sheets 150 may be provided over the optical plate 100 or may be attached onto the optical plate 100 in a light emission direction, i.e., the z-direction. In this case, the thickness of the backlight assembly 2000 and the LCD can be reduced.

The optical plate 100 is not limited to the aforementioned description but may further include a coating layer having a function such as infrared absorption. The optical sheets 150 may be attached onto the optical plate 100.

The supporting member 600 is manufactured in the shape of a rectangular frame, and supports the optical plate 100 and the optical sheets 150. The supporting member 600 also supports the LCD panel provided at a top portion thereof.

The lower receiving member 400 is formed in the shape of a rectangular hexahedron, so that a receiving space with a predetermined depth is defined inside of the lower receiving member 400. A plurality of lamp fixing members 410 are provided in the lower receiving member 400 to support the lamps 310 of the light source unit 300, thereby preventing sag of the lamps 310 and damage thereof caused by external impact. In the above, a plurality of the fixing members 410 may be supported for each lamp 310. A reflective plate (not shown) may be provided on the bottom surface of the lower receiving member 400.

As described above, according to embodiments of the present invention, since a light diffusing agent is not contained in a base material layer but distributed in a lens portion, the amount and cost of the light diffusing agent can be educed, and light transmittance can be improved.

Further, the entire thickness of a completed product can be reduced by decreasing the number of light sources, reducing the number of optical sheets used, and reducing a distance between the light source and the optical plate.

Furthermore, light uniformity can be enhanced without occurrence of bright lines, and intensity of light is improved, thereby enhancing luminance.

In addition, when the optical plate is also large in correspondence with a large display, it is possible to effectively cope with sag of the large optical plate due to its weight.

Particularly, effective light diffusion occurs for light having an optical distribution of a linear light source, thereby achieving uniform luminance throughout an overall display screen and enhancing efficiency of emitted light.

Although embodiments of the present invention has been illustrated and described in connection with the accompanying drawings, it will be understood by those skilled in the art that various modifications and changes can be made thereto without departing from the technical spirit of the invention defined by the appended claims.

Throughout the specification, the term "diffusion portion" is referred to as an area in which a light diffusing agent is distributed on a unit lens. In order to distinguish the diffusion portion from an area in which a light diffusing agent is not distributed, a separate reference numeral is added to the non-distribution area 122. Thus, although a light diffusing agent is distributed into even an unnecessary area in practice unlike the accompanying drawings of the application, this is not departed from the technical spirit of the invention.

What is claimed is:

1. An optical plate, comprising:
a base material layer; and
a lens portion having a plurality of unit lenses formed on one surface of the base material layer, each of the unit lenses having a convex shape,
wherein a diffusion portion is formed in a portion of each of the unit lenses over a center of each of the unit lenses wherein a peripheral portion of each of the unit lenses does not have a diffusion portion formed therein.

2. The optical plate as claimed in claim 1, wherein the diffusion portion is about 20% or less of a height of the unit lens, the maximum thickness of the diffusion portion is about 20% or less of the height of the unit lens, or the diffusion portion is formed in a region over a imaginary line connecting intersection points at which a surface of the unit lens intersects with lines biased at about ±15 degrees from a center line with respect to the center of the unit lens.

3. The optical plate as claimed in claim 1, wherein the diffusion portion is formed in a crescent shape under or on a surface of the unit lens.

4. The optical plate as claimed in claim 1, wherein an interface of the diffusion portion and the unit lens has a shape of one end portion of an ellipse.

5. The optical plate as claimed in claim 4, wherein the unit lens has a shape of one end portion of an ellipse, and a major radius of the ellipse is about 1.4 to about 1.85 times that of a minor radius of the ellipse.

6. The optical plate as claimed in claim 1, wherein the diffusion portion or the base material layer contains at least one light diffusing agent selected from the group comprising silicone-based crosslinked particles, acryl-based crosslinked particles, styrene-based crosslinked particles, methyl methacrylate-styrene copolymer-based crosslinked particles, calcium carbonate, barium sulfate, aluminum hydroxide, titanium oxide, talcum and glass beads.

7. The optical plate as claimed in claim 6, wherein a weight of the light diffusing agent is about 4% or less of that of the diffusion portion.

8. The optical plate as claimed in claim 6, wherein a volume of the light diffusing agent is about 2% or less of that of the diffusion portion.

9. The optical plate as claimed in claim 1, wherein the unit lens has a height of about 50 to about 140 μm.

10. The optical plate as claimed in claim 1, wherein the unit lens has a pitch of about 150 to about 250 μm.

11. The optical plate as claimed in claim 1, wherein the optical plate has a thickness of about 0.8 to about 1.6 mm.

12. The optical plate as claimed in claim 1, wherein in a cross section of the diffusion portion, an angle between extension lines extending from a first point that is a highest point of the unit lens respectively to second and third points of an outer diameter of the unit lens is about 90 to about 108 degrees, the diffusion portion is formed above an extension line connecting the second and third points, and the extension lines connecting the first, second and third points defines an isosceles triangle.

13. The optical plate as claimed in claim 12, wherein a fourth point is positioned below the first point in the isosceles triangle, an extension line extending from the fourth point to the second and third points is curved, and the diffusion portion is formed above an extension line connecting the first, fourth and third points.

14. The optical plate as claimed in claim 1, further comprising at least one film layer formed on one surface of the base material layer.

15. The optical plate as claimed in claim 14, wherein the film layer is provided on the other surface of the base material layer, and random embossed portions are formed on the film layer.

16. The optical plate as claimed in claim 15, wherein an average roughness of the random embossed portions is about 2 to about 3.5.

17. The optical plate as claimed in claim 1, wherein a distance from a point of an outer diameter of the unit lens to the highest point of the unit lens is greater than a distance from the point of the outer diameter to the lowest point of the diffusion portion.

18. A liquid crystal display (LCD), comprising:
a backlight assembly including an optical plate disposed over a light source, the optical plate having a base material layer and a lens portion with a plurality of unit lenses formed on one surface of the base material layer, each of the unit lenses having a convex shape, wherein a diffusion portion is formed in a portion of each of the unit lenses over a center of each of the unit lenses wherein a peripheral portion of each of the unit lenses does not have a diffusion portion formed therein; and
an LCD panel disposed at a light exiting side of the backlight assembly to display images.

* * * * *